No. 655,133. Patented July 31, 1900.
C. A. TRIPP.
CHANGEABLE SPEED GEARING.
(Application filed Feb. 5, 1900.)
(No Model.)
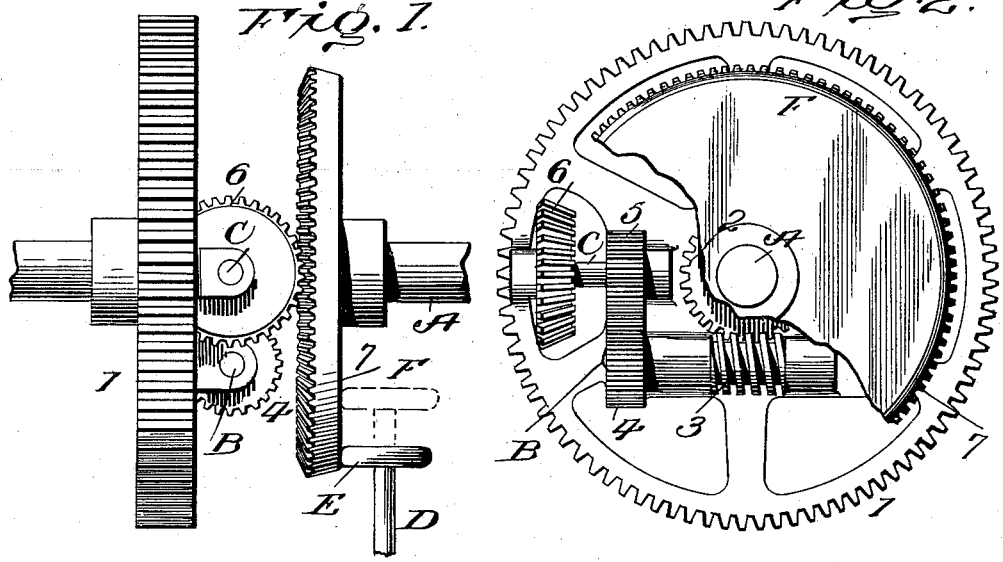
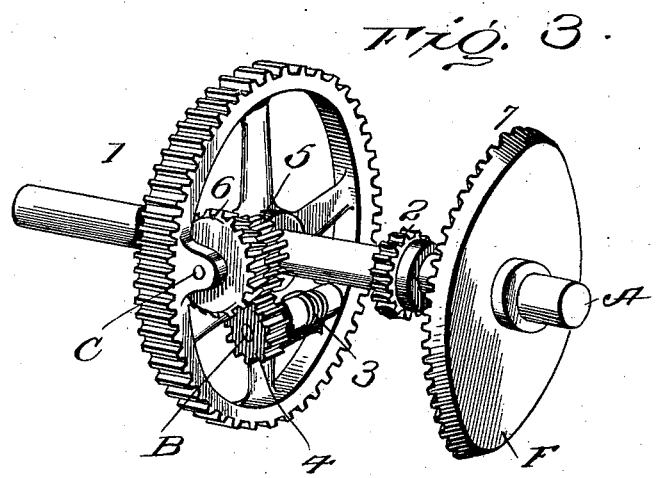
Witnesses
Inventor
C. A. Tripp

UNITED STATES PATENT OFFICE.

CHARLES A. TRIPP, OF HUDSON, MASSACHUSETTS.

CHANGEABLE-SPEED GEARING.

SPECIFICATION forming part of Letters Patent No. 655,133, dated July 31, 1900.

Application filed February 5, 1900. Serial No. 4,013. (No model.)

*To all whom it may concern:*

Be it known that I, CHARLES A. TRIPP, a citizen of the United States, residing at Hudson, in the county of Middlesex and State of Massachusetts, have invented certain new and useful Improvements in Changeable-Speed Gearing; and I do hereby declare the following to be a full, clear, and exact description of the invention, such as will enable others skilled in the art to which it appertains to make and use the same.

This invention relates to gearing for driving operable mechanism at variable rates of speed within certain limits from an initially-driven element or members having a constant motion imparted thereto. The variable speed may be transmitted to the mechanism to be driven by means of either a shaft or a gear element, as desired.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1 is a side view of the gear element or member carrying the train of gearing. Fig. 2 is a front view of a variable-speed gearing constructed in accordance with the principles of this invention. Fig. 3 is a perspective view, the parts being spread or separated to show more clearly the relative arrangement of the parts and the structural details.

Corresponding and like parts are referred to in the following description and indicated in all the views of the drawings by the same reference characters.

The gear elements or members 1 and 7 are coaxially mounted and, as shown, have the shaft A common thereto. The intermediate gear element 2 is keyed to the shaft A, so as to rotate therewith, and is adapted to mesh with an element or train of gearing carried by the member 1, said train of gearing having another element in meshing relation with the cog-gearing of the member 7. The number of elements constituting the train of gearing is unimportant within the purview of the invention and may be of any character so long as it serves to vary the speed and form a gear connection between the members or elements 1 and 7. The shaft A is designed to transmit motion from the variable-speed gearing to the mechanism to be operated; but it is obvious that the member or element 1 may be utilized for this purpose, and in this relation the driving force will be applied to the shaft A and the power expended from the member 1. In the present instance it is contemplated to drive the member or element 1 with a constant power and speed and to provide means for imparting a variable speed from a constant source of power to the element 7. For this purpose a shaft D is shown and is provided with an element E in relation with a friction portion F of the member 7. The part E is shown as a plane friction-surface; but it is obvious that these parts can be constructed as cones or that several cone-pulleys may be mounted on the member 7, or a cone of gears can be similarly mounted, or any known form of transmitting variable motion to the member 7 may be used.

The train of gearing carried by the member 1 comprises a shaft B, journaled in suitable bearings formed with or applied to said member, a worm-gear 3, keyed to the shaft B and meshing with the cogs of the intermediate gear element 2, and a pinion 4, secured to the shaft B and in meshing relation with a companion pinion 5, keyed to a shaft C, mounted in bearings applied to the member 1. A gear 6 is secured to the shaft C, so as to rotate therewith, and is in meshing relation with crown-gearing of the member 7.

As previously intimated, a constant speed is applied to the member 1 and to the shaft D, and when the latter is moved to a position to cause the member 7 to rotate at an equal speed with the member 1 the shaft A will be driven at a speed equal with that of the members 1 and 7. The shaft D is movable to shift the element E toward and from the axial line of rotation of the shaft A, and thereby accelerate or retard the rotation of the member 7 with reference to the member 1 and correspondingly augment or decrease the speed of the shaft A. By accelerating the motion of the member 7 by shifting the element E nearer the shaft A the gear elements 3, 4, 5, and 6 will be caused to rotate relatively to the member 1 and cause the shaft A to rotate backward with reference to said member 1 or at a slower rate of speed. In the same manner if the member 7 is retarded by moving the element E farther from the shaft A the rate of revolution of the shaft A will be increased. By shifting the element E to any point in the range of adjustment along the member 7 the shaft A may be driven at any required speed within certain limits and proportionate to the initial motion imparted to the member 1 and shaft D, as will be readily comprehended. The ultimate result will be the same whether the power is applied to either the shaft A or the member 1. When applied to the shaft A, the effective force will be expended from the member 1, and vice versa. It is not necessary that the gearing be of the cog type, as the mechanism will operate in any well-known form of frictional, belt, or other form of gearing so long as the relation of the elements herein described is maintained.

Having thus described the invention, what is claimed as new is—

The herein-described variable-speed gearing comprising a shaft, a gear fixed to the shaft to rotate therewith, gear elements on opposite sides of said fixed gear and loosely mounted upon said shaft, one of said elements having bevel crown-gearing, a train of gears carried by the other gear element and comprising a pair of shafts, one carrying a worm-gear to mesh with the aforesaid fixed gear and a pinion, and the other gears to mesh, respectively, with said pinion and the bevel crown-gearing of the first-mentioned gear element, the gear element carrying the train of gearing adapted to be driven at a constant speed, and means for imparting a variable motion to the other gear element having the beveled crown-gearing, said means consisting of a shaft carrying a friction-disk to engage a frictional surface of said element, substantially as described.

In testimony whereof I affix my signature in presence of two witnesses.

CHARLES A. TRIPP. [L. S.]

Witnesses:
WM. M. GRAHAM,
CARRIE E. MOSHER.